Aug. 10, 1965 P. BORODAY ETAL 3,199,921
WHEEL COVER
Filed Feb. 4, 1964
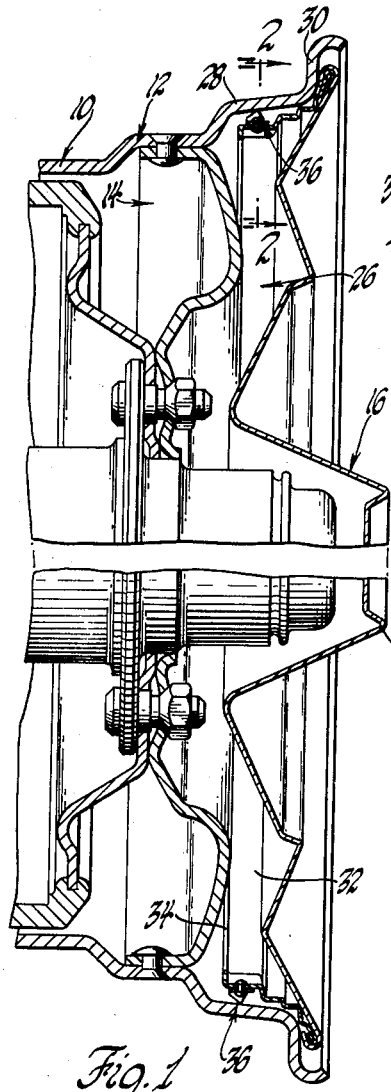
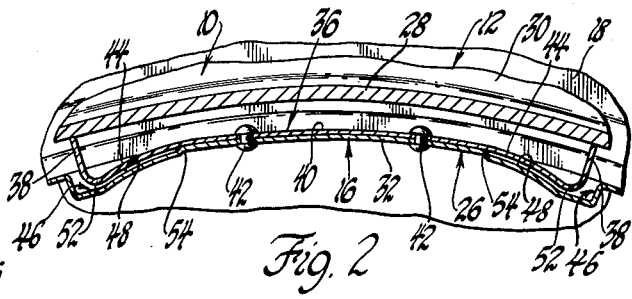
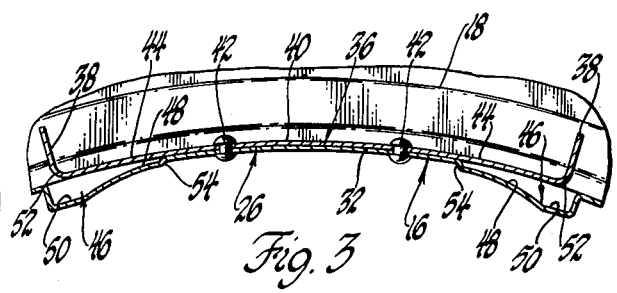
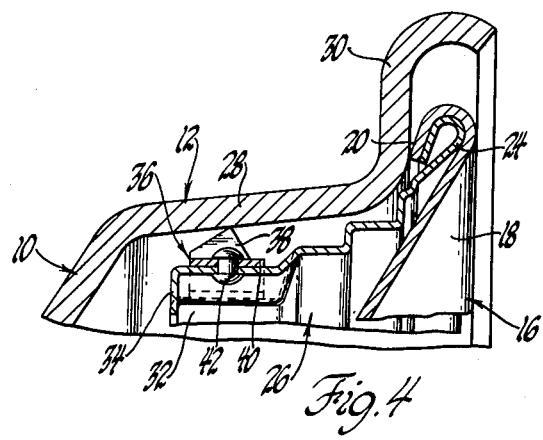
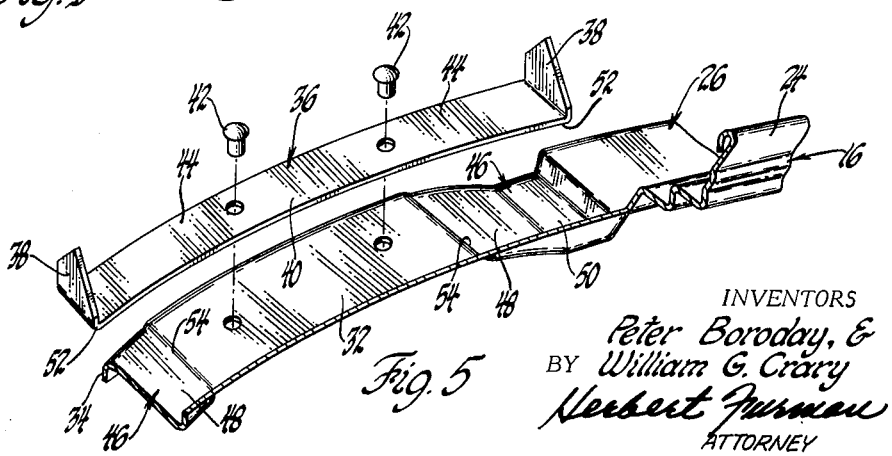
INVENTORS
Peter Boroday, &
BY William G. Crary
Herbert Furman
ATTORNEY 3,199,921
WHEEL COVER
Peter Boroday, Livonia, and William G. Crary, Utica, Mich., assignors to General Motors Corporation, Detroit, Mich., a corporation of Delaware
Filed Feb. 4, 1964, Ser. No. 342,452
4 Claims. (Cl. 301—37)

This invention relates to wheel covers and more particularly to a wheel cover adapted to be self-retainingly mounted on a vehicle wheel.

One feature of this invention is that it provides a wheel cover having improved self-retaining means for mounting the cover on a vehicle wheel. Another feature of this invention is that the retaining means includes a retaining member having a cantilever arm portion displaceable within predetermined limits with respect to an annular flange portion of the cover when the cover is mounted on the wheel. A further feature of this invention is that the annular flange portion is provided with a recess and the arm portion of the retaining member normally overlies the recess but is displaced therewithin when the cover is mounted on the wheel. Yet another feature of this invention is that the arm portion of the retaining member engages a wall of the recess upon displacement of the arm portion a predetermined distance with respect to the flange portion and further displacement of the arm portion thereafter distorts the annular flange portion of the cover.

These and other features of the wheel cover of this invention will be readily apparent from the following specification and drawings wherein:

FIGURE 1 is a sectional view of a vehicle wheel having a wheel cover according to this invention mounted thereon;

FIGURE 2 is an enlarged view taken generally along the plane indicated by line 2—2 of FIGURE 1;

FIGURE 3 is a view similar to FIGURE 2 but with the cover disassembled from the wheel;

FIGURE 4 is an enlarged view of a portion of FIGURE 1; and

FIGURE 5 is an exploded perspective view of a portion of FIGURE 1.

Referring now particularly to FIGURE 1 of the drawings, a conventional vehicle wheel designated generally as 10 includes an annular flanged rim 12 which is riveted or otherwise secured to an annular spider or body portion 14 which in turn is bolted to the axle of the vehicle. The spider 14 of the wheel 10 and a portion of the rim 12 are covered by a wheel cover designated generally 16 according to this invention.

The cover 16 includes a body portion or main cover portion 18 having a peripheral radially in-turned flange 20 which is clinched or crimped over the outer return bent marginal flange portion 24 of an annular retaining member or ring 26 to assemble the member 26 to the cover portion 18. It will be noted that the member 26 extends axially inwardly of the cover member 18 and is of generally stepped cross section, with various annular flange portions thereof being juxtaposed to the radially and axially inwardly extending intermediate flange portion 28 of the rim 12. The engagement of the flange 20 with the flange portion 30 of rim 12 limits axial inward movement of the cover 16 with respect to the rim 12.

The axially innermost flange portion 32 of member 26 includes a radially inwardly extending terminal flange 34 which reinforces or strengthens the member 26. A plurality of retaining members or spring clips 36 are secured to the flange portion 32 and include tooth portions 38 which are adapted to bite into the flange portion 28 of the rim 12 to thereby self-retainingly mount the cover 16 on the wheel. In the specific embodiment shown, four such retaining members 36 are provided, with the members being spaced equidistantly around the periphery of the member 26. It will be understood, of course, that greater or lesser numbers of the members 36 may be provided as desired.

Each such member 36 is of like construction and includes a central or body portion 40 which is riveted at 42 to the flange portion 32 of member 26. Cantilever arm portions 44 extend circumferentially of the member 26 and oppositely of each other from the body portion 40, with the arm portions terminating in the radially outwardly extending tooth portions 38.

The member 26 is provided with pairs of integral asymmetrical recesses or pockets 46 which underlie the arm portions 44 and are inset radially inwardly of the flange portion 32. Each recess 46 includes a circumferentially and radially inwardly sloped ramp or wall 48 which joins to a radially inner and circumferentially extending wall 50, with the walls 48 and 50 defining the lower or base wall of the recess 46 and being joined to the flange portion 32 by integral side wall portions. The width of the recess 46 is sufficient so as to receive the arm portions 44 of member 36 therewithin without interference or binding.

When the cover 16 is disassembled from the vehicle wheel, the arm portions 44 of the members 36 normally overlie their respective recesses 46 as shown in FIGURE 3 of the drawings. As the member 26 is moved inwardly of the annular flange portion 28 of the wheel when the cover 16 is mounted thereon, the engagement of the tooth portions 38 with the flange portion 28 displaces the arm portions 44 of the members 36 radially inwardly with respect to the body portions 40 and within the recesses 46 to a position as shown in FIGURE 2. It will be noted that in this position, some clearance is provided between the arm portions 44 and the walls 48 and 50 of the recess. Due to road shocks or other conditions, the arm portions 44 move relative to the flange portion 32 both toward and away from the walls 48 and 50 of the recesses 46.

It is desirable that the movement or displacement of the arm portions 44 with respect to the flange portion 32 be limited so as to increase the fatigue life of these arm portions. This is accomplished by locating the junctures or abutments 52 of arm portions 44 with respect to the walls 50 of the recesses so that the junctures 52 will engage these walls upon displacement or movement of the arm portions 44 a predetermined distance. Thereafter any further movement of the arm portions 44 independently of the member 26 is prevented and the member 26 will be distorted as a unit with the retaining members 36.

It will be noted that the side walls 54 of the recesses 46 provide fulcrums for bending of the arm portions 44 with respect to the body portions 40 of the retaining members.

Thus, this invention provides an improved wheel cover.

We claim:
1. A wheel cover comprising, a cover member including an annular axially extending flange portion provided with a spaced pair of radially inset radially opening recesses, said recesses being asymmetrically arranged and each including a lower wall provided with a ramp wall portion and an annular wall portion located generally parallel to said flange portion, a retaining member including a body portion secured to said flange portion intermediate said recesses and including circumferentially extending cantilever arm portions, each overlying one of said recesses, said arm portions each including a radially extending tooth engageable with a portion of a vehicle wheel to displace said arm portions relative to said flange portion and within said recesses, the junctures between said arm portions and said tooth portions being engagable with said annular wall portions after said arm por- tions have been displaced a predetermined distance within their respective recesses to limit further movement of said arm portions relative to said annular flange portions and cause said flange portion to be distorted upon further displacement of said arm portions.

2. A wheel cover comprising a cover member including an annular flange portion provided with a radially extending recessed portion having a radially inner wall and a juncture shoulder at one end of the recessed portion, a retaining member including a body portion conforming to the shape of said flange portion and seating thereagainst adjacent said shoulder, means securing said body portion to said flange portion, said retaining member further including a cantilever arm portion extending from said body portion over said juncture shoulder and said recessed portion and normally being located generally parallel to said flange portion, said shoulder providing a fulcrum for said arm portion upon displacement of said arm portion relative to said body within said recessed portion, and means on said arm portion engageable with said radially inner wall of said recessed portion to limit displacement of said arm portion relative to said body portion.

3. A wheel cover as recited in claim 2 wherein said inner wall includes a cam ramp portion engageable with said arm portion means to limit displacement of said arm portion.

4. A wheel cover as recited in claim 2 wherein said arm portion includes a radially extending terminal portion adapted to be engageable with a vehicle wheel to displace said arm portion relative to said body portion, the juncture shoulder between said radially extending terminal portion and said arm portion being engageable with said cam ramp portion to limit displacement of said arm portion relative to said body portion.

References Cited by the Examiner
UNITED STATES PATENTS

| | | | |
|---|---|---|---|
| 2,698,203 | 12/54 | Landell | 301—37 |
| 2,719,757 | 10/55 | Gaylord | 301—37 |
| 2,732,262 | 1/56 | Buerger | 301—37 |
| 3,037,816 | 6/62 | Mulhern | 301—37 |

ARTHUR L. LA POINT, *Primary Examiner.*